United States Patent
Lei et al.

(10) Patent No.: US 10,706,293 B1
(45) Date of Patent: Jul. 7, 2020

(54) VEHICLE CAMERA CLEARNESS DETECTION AND ALERT

(71) Applicant: FORD GLOBAL TECHNOLOGIES, LLC, Dearborn, MI (US)

(72) Inventors: Oliver Lei, Windsor (CA); Allen R. Murray, Lake Orion, MI (US); Brian Bennie, Sterling Heights, MI (US); Mahmoud Y. Ghannam, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/381,188

(22) Filed: Apr. 11, 2019

(51) Int. Cl.
| | | |
|---|---|---|
| *G06K 9/00* | (2006.01) | |
| *G06T 7/00* | (2017.01) | |
| *G07C 5/00* | (2006.01) | |
| *H04N 17/00* | (2006.01) | |
| *B60S 1/56* | (2006.01) | |
| *H04W 4/80* | (2018.01) | |

(52) U.S. Cl.
CPC ........ *G06K 9/00791* (2013.01); *G06T 7/0008* (2013.01); *G07C 5/008* (2013.01); *H04N 17/002* (2013.01); *B60S 1/56* (2013.01); *H04W 4/80* (2018.02)

(58) Field of Classification Search
CPC .. G06K 9/00791; G06T 7/0008; G07C 5/008; H04N 17/002; H04W 4/80; B60S 1/56
See application file for complete search history.

(56) References Cited

U.S. PATENT DOCUMENTS

| | | | |
|---|---|---|---|
| 8,208,043 B2 | 6/2012 | Deng et al. | |
| 9,319,637 B2 | 4/2016 | Lu et al. | |
| 9,445,057 B2 | 9/2016 | May et al. | |
| 10,013,616 B2 | 7/2018 | Gehrke | |
| 2014/0232869 A1* | 8/2014 | May | H04N 7/18 348/148 |
| 2016/0165101 A1* | 6/2016 | Akiyama | H04N 5/23229 348/187 |
| 2016/0364620 A1* | 12/2016 | Akiyama | H04N 7/188 |
| 2018/0316828 A1* | 11/2018 | Lu | H04N 7/18 |
| 2019/0327391 A1* | 10/2019 | Jaggi | H04N 5/2171 |

\* cited by examiner

*Primary Examiner* — John R Schnurr
(74) *Attorney, Agent, or Firm* — Frank L. Lollo; MacMillan, Sobanski & Todd, LLC

(57) ABSTRACT

A method of operating a vehicle may include detecting that a vehicle user is exiting the vehicle, that a user is approaching the vehicle or that the user remote starts the vehicle. Upon the one of these events occurring, automatically conducting a camera lens clearness test. If the test detects an unclear camera lens, notifying the user while outside of the vehicle that the camera lens needs cleaning.

12 Claims, 2 Drawing Sheets

US 10,706,293 B1

VEHICLE CAMERA CLEARNESS DETECTION AND ALERT

BACKGROUND OF THE INVENTION

The present invention relates to a vehicle having an exterior mounted camera and more particularly to such a vehicle having a clearness detection and alert for a vehicle user.

Automotive vehicles commonly have exterior cameras that provide viewing for the vehicle operator on an interior screen and may also provide inputs for a vehicle controller. Since the cameras are on the exterior of the vehicle, it is common that the camera lens picks up dirt or other debris that may block the vision of the camera. In some instances, a vehicle operator will not notice that the camera lens is dirty until getting into the vehicle, starting it, and then putting the vehicle in reverse gear. In such instances, the driver may forgo putting the vehicle transmission back into park and getting out of the vehicle to clean the camera lens. The camera, then, loses the desired functionality that the camera is meant to provide until the lens is cleaned.

Additionally, vehicles may provide remote use of the camera while the vehicle operator is away from the vehicle in order to provide features such as enhanced security or live video or pictures of the area surrounding the vehicle. If the camera lens is dirty in such situations, then the purpose of these features is lost until the lens is cleaned.

SUMMARY OF THE INVENTION

An embodiment contemplates a method of operating a vehicle comprising: detecting that a vehicle user is exiting the vehicle; upon the user exiting the vehicle, automatically conducting a camera lens clearness test; and if the test detects an unclear camera lens, notifying the user while outside of the vehicle that the camera lens needs cleaning.

An embodiment contemplates a method of operating a vehicle comprising: detecting that a user is approaching the vehicle; upon detecting that the user is approaching the vehicle, automatically conducting a camera lens test; and if the test conducted upon detecting that the user is approaching the vehicle detects that a camera lens is unclear, notifying the user while outside of the vehicle that the camera lens needs cleaning.

An embodiment contemplates a method of operating a vehicle comprising: detecting that a vehicle user has remote started the vehicle; upon detecting that the user has remote started the vehicle, automatically conducting the camera lens test; and if the test conducted upon the remote starting of the vehicle detects that the camera lens is unclear, notifying the user while outside of the vehicle that the camera lens needs cleaning.

An advantage of an embodiment is that, after camera clearness detection, a driver alert may provide information to the driver upon exiting the vehicle, when remote from the vehicle or when returning to the vehicle that the camera lens needs cleaning. The driver alert may be a message sent to the driver's mobile phone and may also include the vehicle beeping a horn or flashing lights to remind the driver to clean the camera lens. This may be particularly useful for vehicles that do not have a built-in camera lens cleaning system.

DETAILED DESCRIPTION

Figure 1:
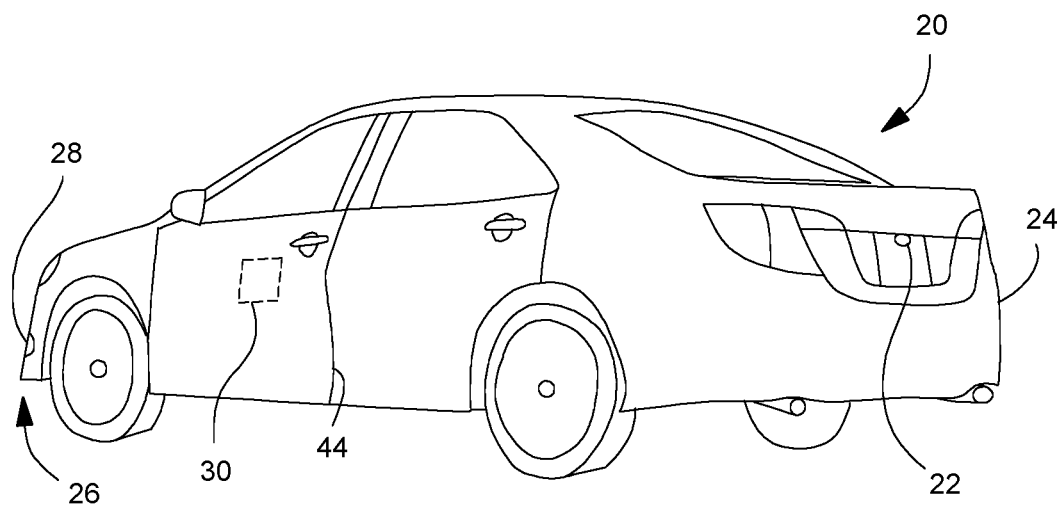
FIG. 1 is a schematic perspective view of a vehicle and wireless communication with a vehicle operator.
Figure 1:
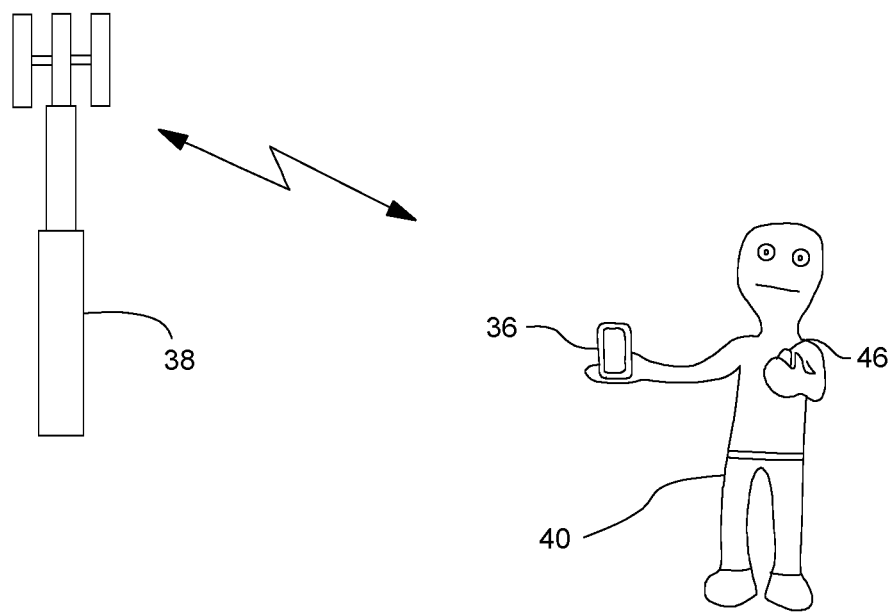
Figure 2:
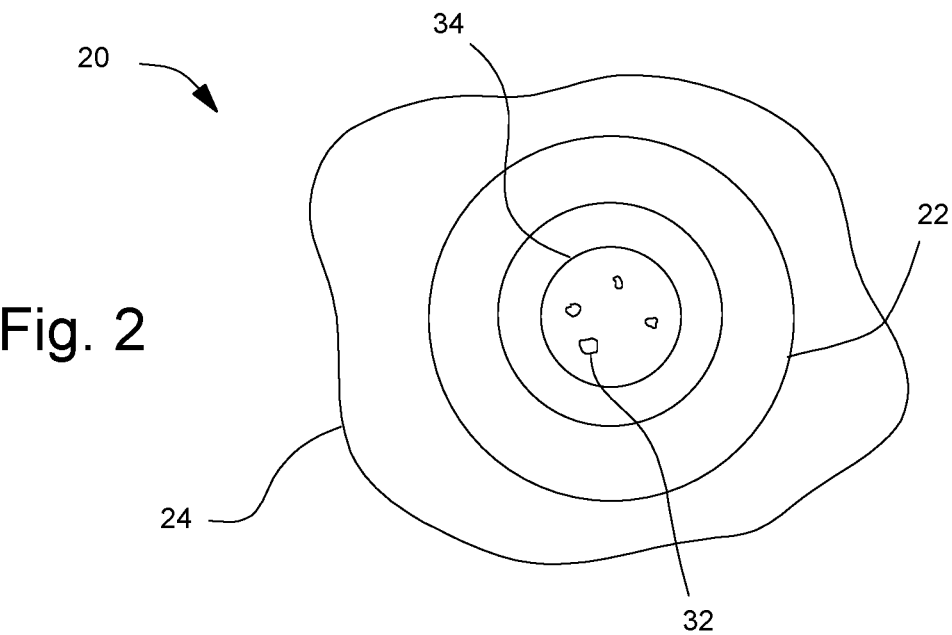
FIG. 2 is a schematic elevation view of a vehicle exterior camera and lens.
Figure 3:
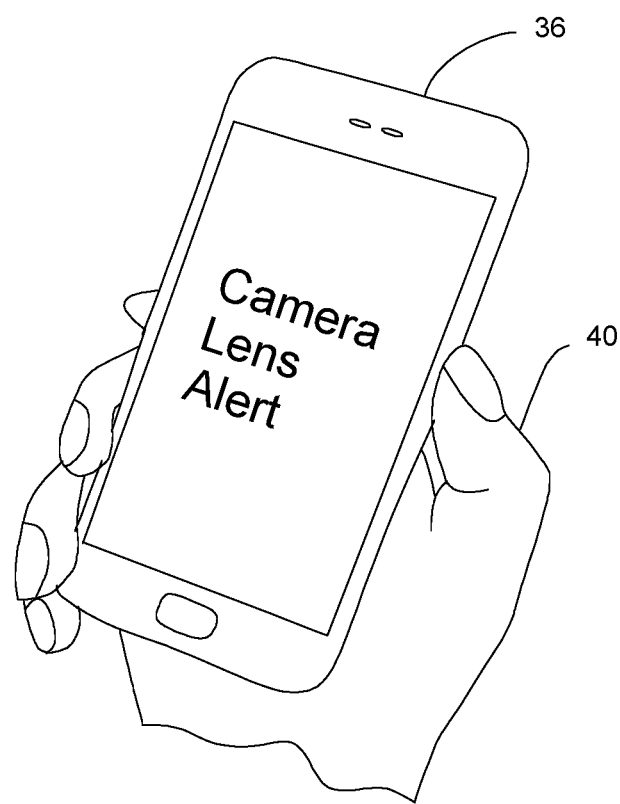
FIG. 3 is a schematic perspective view of a mobile phone being held by the vehicle operator.

FIGS. 1-3 illustrate a vehicle 20 having a backup camera 22 mounted on a rear end 24 of the vehicle exterior. The vehicle 20 may also have a three-hundred sixty degree camera system 26 that includes additional cameras 28 at various locations on the vehicle exterior.

The vehicle 20 may also include a communications and control system 30 that receives the signals from the camera (s) 22, 28, displays the images on a vehicle internal display, detects debris 32 on a camera lens 34 of the backup camera 22 (and possibly other cameras), and wirelessly communicates with a mobile device 36 (such as a mobile phone) of a vehicle user/owner 40 via a wireless network 38 or via other wireless means, such as for example via Bluetooth Low Energy (BLE) wireless transmissions. This communication and control system 30 and the mobile device 36 may also include global positioning system (GPS) modules or other vehicle/device location detection systems. The communication and control system 30 may be made up of various combinations of electronic hardware and software and may include separate processors or be built into other vehicle electronic systems such as a vehicle body control module and/or a vehicle telematics control module. Communicating with mobile devices via a wireless network, BLE and detecting debris 32 on a camera lens 34 are known to those skilled in the art and so will not be discussed further herein.

The communications and control system 30 may be employed to alert the vehicle user/owner 40 of an unclear/unclean camera lens 34 during the most opportune times for providing an alert. Thus the triggers for initiating a camera lens condition check may include when the communications and control system 30 detects that the user/owner 40 has just turned off and exited the vehicle 20, detects that the user/owner 40 is approaching the vehicle 20 and is within a certain distance from the vehicle 20 while parked, and when the user/owner 40 remote starts the vehicle 20 via a mobile application such as one on the mobile device 36. Under these conditions where the user/owner 40 is generally close to and outside of the vehicle 20, the user/owner 40 is most likely to make the effort to manually clean the debris 32 from the camera lens(es) 34.

Detecting the user/owner 40 exiting the vehicle 20 may include for example an engine being stopped (or the vehicle transmission be placed in Park) followed by an opening and closing of a driver's door 44.

Detecting that the user/owner 40 is approaching and is within a certain distance from the vehicle 20 while parked may include detecting that the user/owner's mobile device 36 or a key fob 46 for the vehicle is relatively close by and is coming closer to the vehicle 20. Or, using vehicle cameras, facial recognition and gait algorithms may be employed to detect that the user/owner 40 is approaching and is within a certain distance from the vehicle 20. For example, detecting that the user/owner 40 is approaching the vehicle 20 may include comparing the vehicle GPS location with the mobile device GPS location, or monitoring the signal strength of the key fob 46, or employing BLE for the system 30 to detect a Bluetooth signal from the mobile device 36.

Remote starting of the vehicle 20 may occur for example via the mobile device 36 or key fob 46.

Upon the communications and control system 30 detecting one of the conditions noted above, the system 30 runs a camera clearness self-check. If the camera lens 34 (or lenses) are clean (i.e., pass the clearness self-check), then no action needs to be taken. However, if the self-check detects one or more camera lens(es) 34 need cleaning, the communication and control system 30 sends an alert message to the mobile device 36 that alerts the user/owner 40 of the dirty lens(es) 34. The communication and control system 30 may also include beeping the vehicle horn or flashing vehicle lights to remind the user/owner 40 to clean the dirty lens(es) 34. Accordingly, the user/owner 40, having been notified while outside of the vehicle 20 can easily clean the lens(es) 34 before entering or leaving the vehicle 20.

While certain embodiments of the present invention have been described in detail, those familiar with the art to which this invention relates will recognize various alternative designs and embodiments for practicing the invention as defined by the following claims.

The invention claimed is:

1. A method of operating a vehicle comprising:
   detecting that a vehicle user is exiting the vehicle;
   upon detecting the user exiting the vehicle, automatically conducting a camera lens clearness test; and
   if the test detects an unclear camera lens, notifying the user while outside of the vehicle that the camera lens needs cleaning.

2. The method of claim 1 wherein the step of notifying the user includes sending a wireless signal to a mobile device with a message indicating that the camera lens needs cleaning.

3. The method of claim 2 wherein the step of detecting that the vehicle user is exiting the vehicle includes stopping the vehicle and opening and closing a driver door.

4. The method of claim 1 wherein the step of detecting that the vehicle user is exiting the vehicle includes stopping the vehicle and opening and closing a driver door.

5. The method of claim 1 further including:
   detecting that the user is approaching the vehicle;
   upon detecting that the user is approaching the vehicle, automatically conducting the camera lens test; and
   if the test conducted upon detecting that the user is approaching the vehicle detects that the camera lens is unclear, notifying the user while outside of the vehicle that the camera lens needs cleaning.

6. The method of claim 5 wherein the step of notifying the user includes sending a wireless signal to a mobile device with a message indicating that the camera lens needs cleaning.

7. The method of claim 5 further including:
   detecting that the user has remote started the vehicle;
   upon detecting that the user has remote started the vehicle, automatically conducting the camera lens test; and
   if the test conducted upon the remote starting of the vehicle detects that the camera lens is unclear, notifying the user while outside of the vehicle that the camera lens needs cleaning.

8. The method of claim 1 further including:
   detecting that the user has remote started the vehicle;
   upon detecting that the user has remote started the vehicle, automatically conducting the camera lens test; and
   if the test conducted upon the remote starting of the vehicle detects that the camera lens is unclear, notifying the user while outside of the vehicle that the camera lens needs cleaning.

9. The method of claim 1 further including:
   upon detecting the user exiting the vehicle, automatically conducting a second camera lens clearness test for a second camera lens; and
   if the second test detects that the second camera lens is unclear, notifying the user while outside of the vehicle that the second camera lens needs cleaning.

10. A method of operating a vehicle comprising:
    detecting that a user is approaching the vehicle;
    upon detecting that the user is approaching the vehicle, automatically conducting a camera lens test; and
    if the test conducted upon detecting that the user is approaching the vehicle detects that a camera lens is unclear, notifying the user while outside of the vehicle that the camera lens needs cleaning.

11. The method of claim 10 further including:
    detecting that the user has remote started the vehicle;
    upon detecting that the user has remote started the vehicle, automatically conducting the camera lens test; and
    if the test conducted upon the remote starting of the vehicle detects that the camera lens is unclear, notifying the user while outside of the vehicle that the camera lens needs cleaning.

12. The method of claim 10 further including:
    upon detecting that the user is approaching the vehicle, automatically conducting a second camera lens clearness test for a second camera lens; and
    if the second test detects that the second camera lens is unclear, notifying the user while outside of the vehicle that the second camera lens needs cleaning.

\* \* \* \* \*